(12) United States Patent
Hunter et al.

(10) Patent No.: US 10,364,865 B2
(45) Date of Patent: Jul. 30, 2019

(54) CIRCULAR FORCE GENERATOR (CFG) DEVICES, SYSTEMS, AND METHODS HAVING INDIRECTLY DRIVEN IMBALANCED ROTORS

(71) Applicant: LORD Corporation, Cary, NC (US)

(72) Inventors: Anthony G. Hunter, Raleigh, NC (US); Russell E. Altieri, Holly Springs, NC (US); Warren F. Brannan, Sanford, NC (US); Mark R. Jolly, Raleigh, NC (US)

(73) Assignee: LORD Corporation, Cary, NC (US)

( * ) Notice: Subject to any disclaimer, the term of this patent is extended or adjusted under 35 U.S.C. 154(b) by 227 days.

(21) Appl. No.: 14/912,820

(22) PCT Filed: Aug. 29, 2014

(86) PCT No.: PCT/US2014/053431
§ 371 (c)(1),
(2) Date: Feb. 18, 2016

(87) PCT Pub. No.: WO2015/031768
PCT Pub. Date: Mar. 5, 2015

(65) Prior Publication Data
US 2016/0195161 A1 Jul. 7, 2016

Related U.S. Application Data

(60) Provisional application No. 61/871,646, filed on Aug. 29, 2013, provisional application No. 61/871,620, filed on Aug. 29, 2013.

(51) Int. Cl.
*F16F 15/14* (2006.01)
*F16F 15/22* (2006.01)
(Continued)

(52) U.S. Cl.
CPC ........ *F16F 15/1464* (2013.01); *B64C 27/001* (2013.01); *F16F 15/10* (2013.01);
(Continued)

(58) Field of Classification Search
CPC .... F16F 15/10; F16F 15/1202; F16F 15/1204; F16F 15/1205; F16F 15/1206;
(Continued)

(56) References Cited

U.S. PATENT DOCUMENTS 5,410,879 A * 5/1995 Houze ............... B06B 1/166
60/469
5,860,321 A * 1/1999 Williams ............ F16H 33/08
74/143
(Continued)

OTHER PUBLICATIONS

European Patent Office, PCT International Search Report and Written Opinion for International Application No. PCT/US2014/053431 dated Nov. 18, 2014, 12 pages.

*Primary Examiner* — Adam D Rogers
(74) *Attorney, Agent, or Firm* — Richard G. Miller

(57) ABSTRACT

Circular force generator (CFG) devices, systems, and methods are disclosed having indirectly driven imbalanced rotors for generating vibrations and/or imparting vibration control. A CFG device (10) includes a first set of imbalanced rotors (12) disposed about a center point and a second set of imbalanced rotors (12) disposed about the center point. The first set of imbalanced rotors is configured to co-rotate synchronously. The second set of imbalanced rotors is configured to co-rotate synchronously. The first and second sets of imbalanced rotors are configured to create a controllable rotating force vector having a controllable magnitude and phase about the center point. A CFG system includes a controller and one or more CFG devices configured to receive control commands from the controller. A method of generating a force via a CFG device includes receiving a (Continued)

force command and generating a force in response to receiving the force command.

31 Claims, 14 Drawing Sheets

(51) Int. Cl.
*B64C 27/00* (2006.01)
*F16F 15/10* (2006.01)
*F16F 15/30* (2006.01)

(52) U.S. Cl.
CPC .......... *F16F 15/14* (2013.01); *F16F 15/1478* (2013.01); *F16F 15/30* (2013.01); *B64C 2027/003* (2013.01); *B64C 2027/004* (2013.01)

(58) Field of Classification Search
CPC .... F16F 15/1207; F16F 15/14; F16F 15/1464; F16F 15/1471; F16F 15/1478; F16F 15/20; F16F 15/223; F16F 15/30; B64C 27/001; B64C 2027/002; B64C 2027/003; B64C 2027/004
See application file for complete search history.

(56) References Cited

U.S. PATENT DOCUMENTS

| | | | |
|---|---|---|---|
| 5,903,077 A | 5/1999 | Garnjost et al. | |
| 8,267,652 B2* | 9/2012 | Jolly | B64C 27/001 |
| | | | 415/1 |
| 2006/0135302 A1 | 6/2006 | Manfredotti et al. | |
| 2011/0194934 A1 | 8/2011 | Popelka et al. | |
| 2012/0181377 A1 | 7/2012 | Eller et al. | |
| 2012/0232780 A1 | 9/2012 | Delson et al. | |
| 2015/0232174 A1* | 8/2015 | Jolly | B64C 27/001 |
| | | | 74/574.2 |
| 2015/0321753 A1* | 11/2015 | Black | B64C 27/001 |
| | | | 188/378 |

* cited by examiner

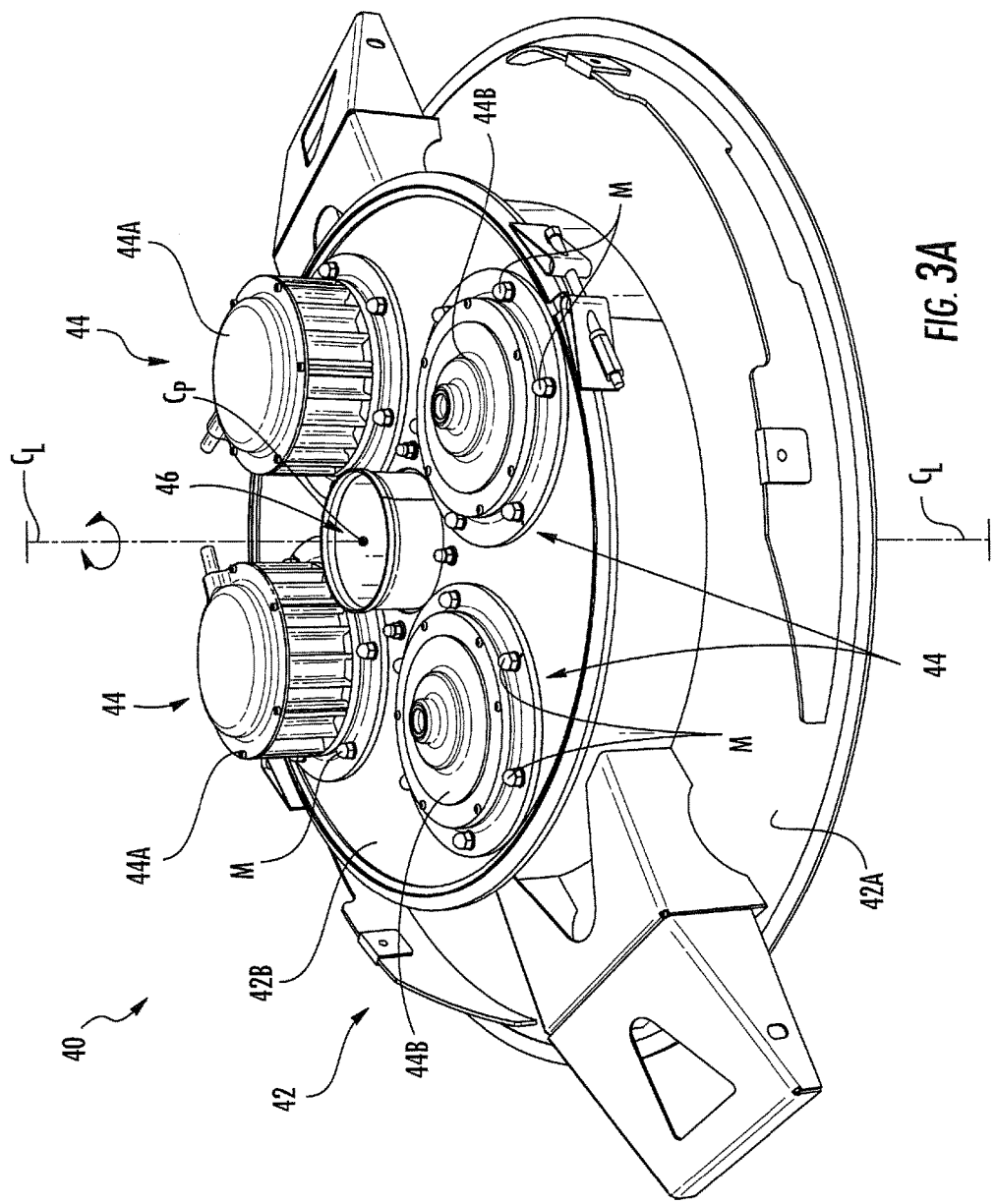

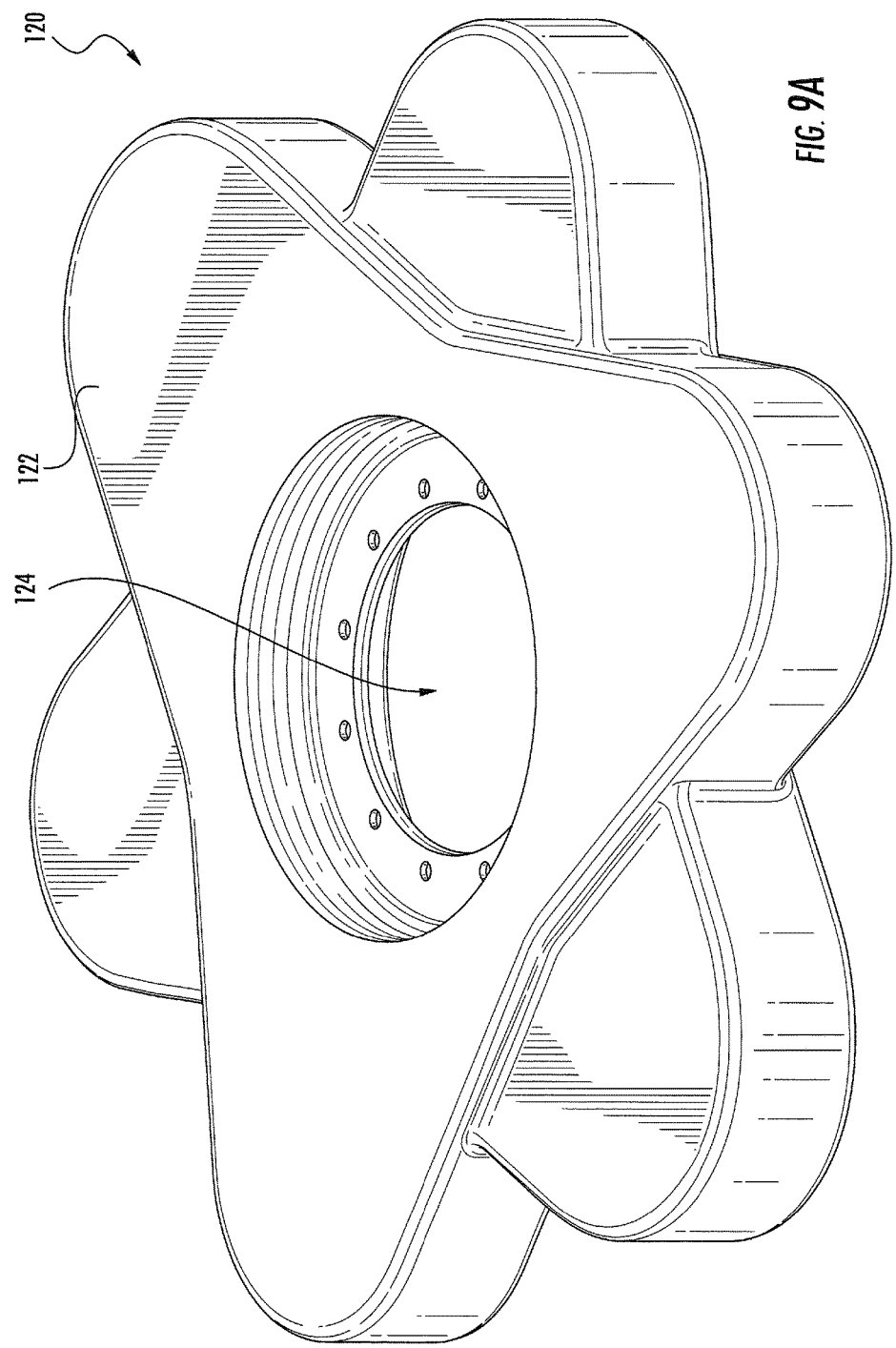

CIRCULAR FORCE GENERATOR (CFG) DEVICES, SYSTEMS, AND METHODS HAVING INDIRECTLY DRIVEN IMBALANCED ROTORS

CROSS REFERENCE TO RELATED APPLICATION

This application relates and claims priority to U.S. Provisional Patent Application Ser. No. 61/871,620, filed Aug. 29, 2013, and to U.S. Provisional Patent Application Ser. No. 61/871,646, filed Aug. 29, 2013, the disclosures of which is fully incorporated herein by reference, in their entireties.

TECHNICAL FIELD

The present subject matter relates generally to force generator devices, systems, and methods. More particularly the present subject matter relates to circular force generator (CFG) devices, systems, and methods having indirectly driven imbalanced rotors for generating vibrations and/or imparting vibration control.

BACKGROUND

Various types of structures or platforms, not limited to vehicles, aircraft, helicopters, machinery, equipment, buildings, bridges, etc., experience vibration during operation. Over time, vibration may damage or induce damage to the structure and/or components thereof, including contents or occupants disposed therein. This increases costs associated with maintaining and providing the structures, such as costs associated with inspecting and replacing parts that may become damaged during vibration. Current solutions in the field of vibration control are expensive to produce, manufacture, and must be customized and/or custom designed for use in different applications.

In view of these problems, a need exists for vibration control devices, such as force generator devices, systems, and methods, for providing lower cost vibration control solutions, in which a common design may be suitable for use in different applications and/or be scalable to different vibrating structures not limited to buildings, structures, machinery, equipment, vehicles, aircraft, etc. A need also exists for controlling vibration in industrial machinery, by using or inducing controlled vibration profiles.

SUMMARY

In accordance with the disclosure provided herein, novel and improved circular force generator (CFG) devices, systems, and methods having indirectly driven imbalanced rotors are provided.

In one embodiment, a CFG device is provided. A CFG device includes a first set of imbalanced rotors disposed about a center point and a second set of imbalanced rotors disposed about the center point. The first set of imbalanced rotors is configured to co-rotate synchronously about the center point. The second set of imbalanced rotors is also configured to co-rotate synchronously about the center point. In one embodiment, the first and second sets of imbalanced rotors are configured to create a controllable rotating force vector having a controllable magnitude and phase about the center point.

In one embodiment, a CFG system is provided. A CFG system includes a controller and a CFG device configured to receive control commands from the controller. The CFG device includes at least one set of imbalanced rotors configured to co-rotate synchronously about different, non-coaxial axes. The at least one set of imbalanced rotors is configured to create a rotating force vector about a center point of the CFG device.

A method of generating a force via a CFG device or system is also provided. The method includes receiving a force command and generating a force in response to receiving the force command. Generating the force includes co-rotating one or more sets of imbalanced rotors about different, non-coaxial axes disposed about a center point of the CFG device.

These and other objects of the present disclosure as may become apparent from the disclosure herein are achieved, at least in whole or in part, by the subject matter disclosed herein.

BRIEF DESCRIPTION OF THE DRAWINGS

FIGS. 3A and 3B illustrate perspective views of another embodiment of a CFG device according to aspects of the disclosure herein.

FIGS. 9A and 9B illustrate further embodiments of a CFG device according to aspects of the disclosure herein.

DETAILED DESCRIPTION

The subject matter described herein is directed to improved force generator (FG) devices, systems, and methods. Improved FG devices, systems, and methods described herein include circular force generator (CFG) devices, systems, and methods configured for providing a rotating force vector of a controllable magnitude and phase about a center point of the device or system. The force is used to impart a vibration to a structure (e.g., for use in industrial vibratory equipment, e.g. FIG. 8) or to actively control vibration of or within a structure (i.e., cancelling vibration imparted by a helicopter main/tail rotor). CFG devices, systems, and methods herein include non-coaxial and/or indirectly driven imbalanced rotors and/or masses, which both lowers the cost of providing vibration control and provides a simplified, scalable FG design thereby enabling vibration of and/or vibration control for a variety of different applications.

Figures (also "FIGS.") 1 to 12 illustrate various views and/or features associated with CFG devices, systems, and related methods for controlling vibration of and/or within various structures, vehicles, aircraft, helicopters, machinery, equipment, buildings, bridges, etc., which experience vibration during operation. CFG devices, systems, and related methods described herein may also impart vibration to a structure where desired, for example, in industrial machinery or equipment.

CFG devices and systems herein may include a common design and/or a design having common structure in which one or more sets of imbalanced rotors are configured to rotate, synchronously, and in a same direction to minimize, cancel, and/or eliminate vibration on/within a vibrating structure or platform. CFG devices, systems, and related methods described herein are scalable (e.g., scaled larger or smaller) for attachment to various sized and/or shaped vibrating structures. Thus, CFG devices, systems, and methods described herein utilize common designs having non-coaxial imbalanced rotors for use in controlling vibration in a wide variety of applications.

Figure 1:
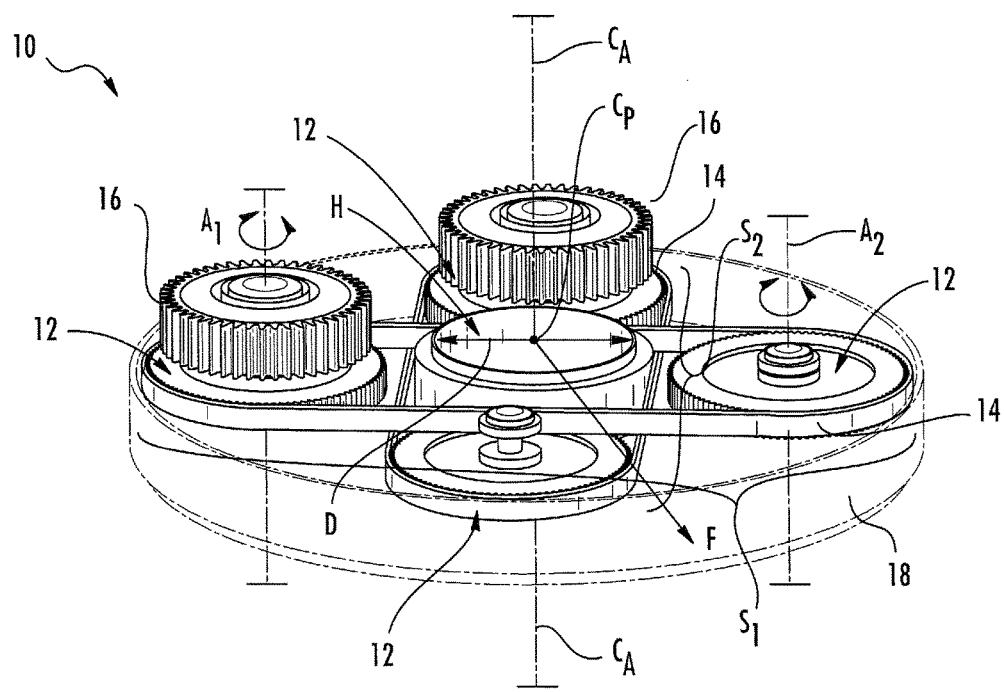
FIG. 1 illustrates a perspective view of one embodiment of a circular force generator (CFG) device according to aspects of the disclosure herein.

FIG. 1 is a front perspective view of a first embodiment of a CFG device, generally designated 10, for use in inducing or controlling vibration of a structure, equipment, vehicle, or platform. Device 10 includes one or more imbalanced rotors, generally designated 12, including imbalanced mass concentrations for co-rotating in sets or groups synchronously, thereby creating a rotating force of a force vector F. Force vector F includes a fixed magnitude at a center point $C_P$ for inducing or controlling vibration on and/or within the structure, equipment, vehicle, and/or platform. In some aspects, force vector F is in a horizontal/radial plane.

Center point $C_P$ of device 10 is disposed along a central axis $C_A$ of device 10. A plurality of imbalanced rotors 12 is disposed about center point $C_P$. In some embodiments, rotors 12 are disposed in an annular ring or "donut" shape about center point $C_P$. Rotors 12 may be provided in one or more groups, sets, or pairs of imbalanced rotors. Any number of imbalanced rotors 12 may be provided in a given set or group, for example, two or more imbalanced rotors 12 may be included in a first set $S_1$, three or more imbalanced rotors 12 may be included in first set $S_1$, or more than four imbalanced rotors 12 may be included in first set $S_1$. Each group or set of imbalanced rotors is mechanically linked via a mechanical coupler or coupling device 14. Coupler device 14 may include a belt, gear, pulley, wheel, axle, sprocket, or any other type of device configured to physically and/or mechanically link imbalanced rotors 12, such that movement of one imbalanced rotor imparts movement to other imbalanced rotors in the same set or group.

Device 10 may include a second group of two or more imbalanced rotors, generally designated $S_2$. Imbalanced rotors 12 of first and second groups $S_1$ and $S_2$, respectively, may alternate (e.g., 360°) about center point $C_P$, and may co-rotate about independent axes thereby providing or generating a vibration cancelling force of force vector F at or about center point $C_P$. Force vector F has a magnitude and phase, which may be controlled by phasing the rotation of imbalanced rotors in first and second sets $S_1$ and $S_2$. In each of the embodiments, a rotating force F is generated when imbalanced rotors 12 in first set $S_1$ spin in a same direction as imbalanced rotors 12 in second set $S_2$. In the alternative, a linear force with a controllable phase may be created when rotors 12 in first set $S_1$ spin in the opposite direction as rotors 12 in second set $S_2$.

Each group or set (i.e., $S_1$, $S_2$) of imbalanced rotors includes at least two imbalanced rotors in the form of imbalanced sprockets, pulleys, or gears (i.e., a first and a second imbalanced rotor 12 per set $S_1$ and/or $S_2$), where at least one of the rotors 12 is directly driven by a motor 16 and the remaining rotor(s) 12 in each set is/are mechanically linked to the motor driven imbalanced rotor. Thus, the motor driven rotor induces rotation of the non-motor driven rotor or rotors in each set $S_1$ and $S_2$. Indirectly driven rotors are referred to as "followers". Imbalanced rotors 12 associated with each set $S_1$ and $S_2$ are non-coaxial with respect to each other and center point $C_P$. For example, the two rotors 12 in set $S_1$ rotate about individual axes axis $A_1$ and $A_2$, etc.

Respective imbalanced rotors 12 associated with each set $S_1$ and $S_2$ of rotors are configured to co-rotate in a given direction (e.g., clockwise or counterclockwise) for generating a rotating force vector having a fixed magnitude at or about center point $C_P$. The imbalanced rotors 12 of each set $S_1$ and $S_2$ collectively generate a controllable rotating force vector (i.e., F) at center point $C_P$. This rotating force vector F essentially allows the two or more groups of two or more imbalanced rotors 12 to act as a single pair of co-rotating imbalanced rotors centered at $C_P$. The first set $S_1$ of imbalanced rotors 12 and the second set $S_2$ of imbalanced rotors 12 may be individually phased to provide a controllable rotating force vector. In some embodiments, individual imbalanced masses or rotors 12 within a set or group are oriented so that a twist moment about center point $C_P$ is equal to or approximately zero.

Still referring to FIG. 1 and in some embodiments, imbalanced masses 12 are integrally built into gears and/or sprockets disposed within a CFG housing 18. Housing 18 is illustrated in broken lines, as it may include any size and/or shape which is scalable for use in a variety of vibrating and/or vibration control applications. Motors 16 are typically configured to directly drive at least some of the imbalanced rotors 12 comprised of gears or sprockets, while other imbalanced rotors 12 comprising gears or sprockets are indirectly driven via the mechanical link or coupling device 14. Mechanical coupling devices 16 may include providing one or more belts (e.g., a timing belt), one or more gears (e.g., spur gears), one or more chains, and/or additional, intervening sprockets.

In some embodiments, device 10 includes two pairs of imbalanced sprockets (i.e., rotors 12), which are interconnected with a timing belt (i.e., 14). Two motors 16 are directly connected to at least two of the sprockets (i.e., 12), one in first set $S_1$ and one in second set $S_2$. One motor 16 may co-rotate at least two non-coaxial sprockets (i.e., 12) simultaneously via movements transferred using belt or coupler device 14. The sprockets on a common timing belt have imbalanced masses that are "clocked" or oriented identically about center point $C_P$ so that the moment about the centerline axis $C_A$ for each pair or set $S_1/S_2$ is approximately zero.

This configuration enables device 10 to incorporate and/or include a central opening, aperture or through-hole, generally designated H, having an inner diameter D. Through-hole H is open for receiving and/or attaching to portions of vibrating machinery, equipment, vehicles, etc., thereby obviating the need for large diameter bearings and/or costly ring motors. Thus, device 10 includes a low cost and low weight option for imparting/controlling vibration to/of a plurality of different types of machines, vehicles, equipment, etc., while maintaining the through hole H unobstructed. Devices described herein may rotate as a whole (e.g., the entire device 10 spins/rotates) or devices described herein may be entirely stationary, but for the rotating imbalance rotors.

Figure 2A:
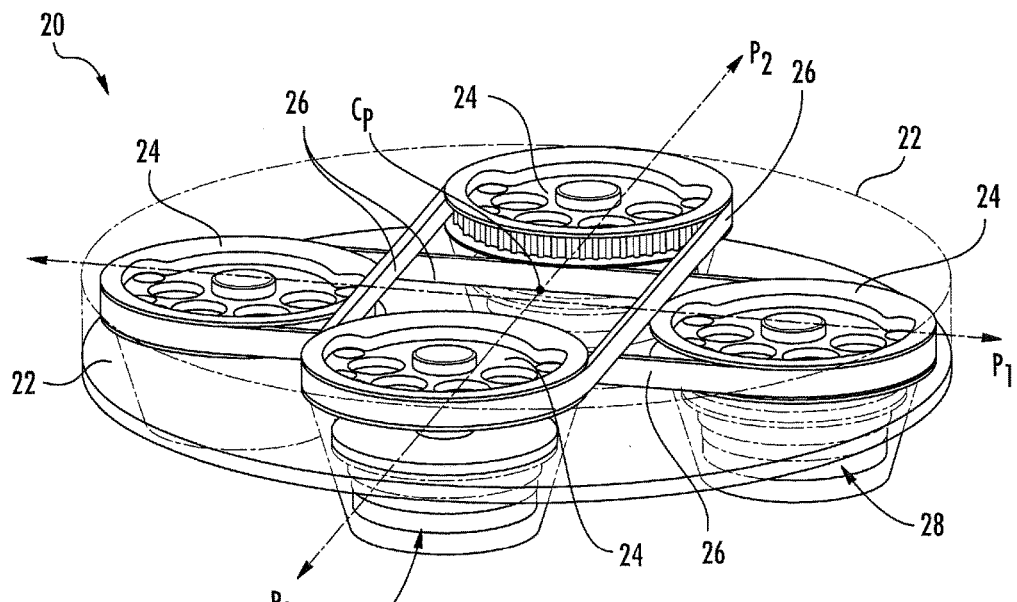
FIGS. 2A to 2C illustrate perspective, plan, and sectional views, respectively, of another embodiment of a CFG device according to aspects of the disclosure herein.
Figure 2B:
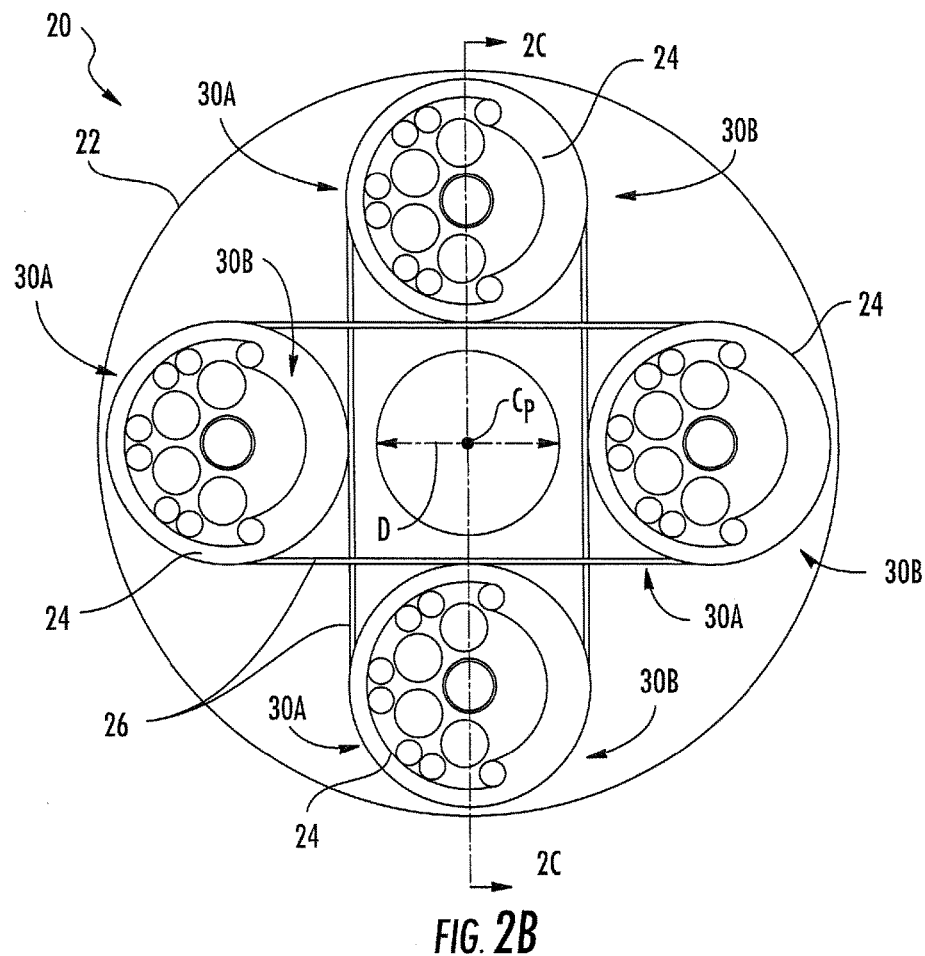
Figure 2C:
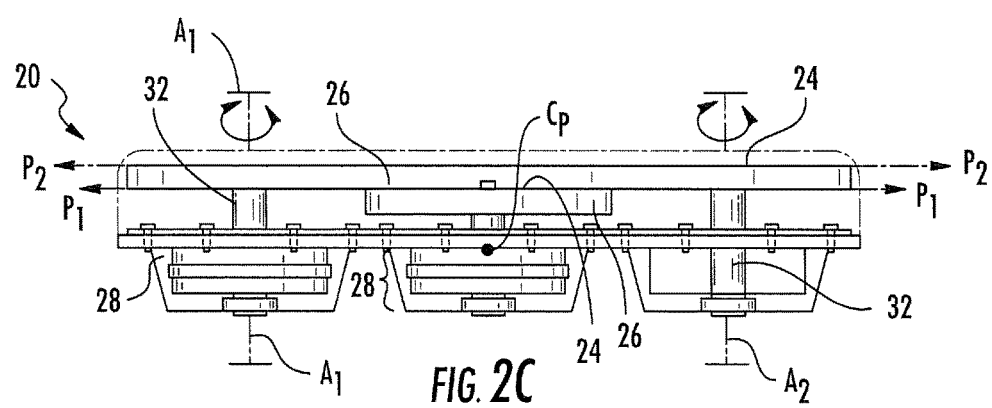

FIGS. 2A to 2C illustrate further embodiments of a CFG device, generally designated 20. Referring to FIGS. 2A to 2C collectively, device 20 includes a housing 22 configured to house and/or support one or more imbalanced masses or rotors 24 including imbalanced masses within device 20. Housing 22 is illustrated in broken lines so that portions disposed inside of housing are visible in FIG. 2A, which otherwise may not be visible from the outside of device 20.

Device 20 may be configured for attachment to and/or over vibrating machinery, equipment, vehicles, structures, platforms, etc., and/or portions or components thereof. Imbalanced rotors 24 may be provided in one or more sets, or groups which are mechanically linked via a mechanical coupler or coupling device 26. Typically, at least a first imbalanced rotor per set of imbalanced rotors is directly driven via a motor, generally designated 28. At least a second imbalanced rotor per set of imbalanced rotors is indirectly driven via motor 28 upon receiving motion imparted thereto via coupling device 26. Each set of imbalanced rotors is configured to synchronously co-rotate about non-coaxial axes.

As FIG. 2A illustrates, imbalanced rotors 24 include imbalanced sprockets or gears disposed between one or more bearings. A first set of imbalanced rotors 24 may include upper faces linearly aligned along and/or be located in a same plane, such as a first plane $P_1$, and a second set of imbalanced rotors 24 may include upper faces linearly aligned along and/or be located within a same plane, such as a second plane $P_2$, that is different from first plane $P_1$. First and second planes $P_1$ and $P_2$ may be vertically disposed with respect to each other, such that at least some of the imbalanced rotors 24 are located or disposed on a plane above some of the other imbalanced rotors 24.

Imbalanced rotors 24 of a given set may be positioned opposite each other about a center point $C_P$ of device 20, and configured to co-rotate in a same direction at a same time. Imbalanced rotors 24 in each set simultaneously rotate in a same direction in a synchronized movement, such that the movements of the similarly shaped/aligned imbalanced rotors 24 are synchronized. Several sets of imbalanced rotors 24 may collectively rotate for generating a controllable rotating force vector (e.g., F, FIG. 1) having a controllable magnitude and phase at center point $C_P$ for reducing or creating vibration within a machine, equipment, vehicle, structure, etc.

In some embodiments, the speed and direction at which imbalanced rotors 24 rotate is controllable via an electronic control unit or component (e.g., 156, FIG. 11), which is configured to detect a vibration level of the component or structure to which device 20 is attached. In some embodiments, device 20 imparts vibration to a structure for performing a function (i.e., conveying as described in reference to FIG. 8). In other embodiments, device 20 generates an equal and opposing force for cancelling vibration of the component or structure to which device 20 is attached.

FIG. 2B is a top plan view of device 20. As FIG. 2B illustrates, opposing imbalanced rotors 24 are configured into one set by coupling device 26. One rotor per set is directly driven or rotated by motor 28 (FIG. 2A), while the other rotor or rotors per set is/are indirectly driven or rotated by motor 28, and is/are configured to rotate upon movement imparted by coupling device 26. Each rotor 24 per set rotate co-rotate in a same direction (e.g., clockwise or counterclockwise) and at a same speed. Each rotor 24 per set is also aligned or oriented directly for minimizing a moment about the centerline axis $C_A$.

As FIG. 2B illustrates, each imbalanced rotor 24 includes a first side, generally designated 30A and a second, more heavily weighted side, generally designated 30B. The difference in weight or mass between first and second sides 30A and 30B, respectively, generates an imbalance, thereby providing imbalanced masses, which rotate in the form of imbalanced rotors 24. Each set of rotors 24, which are connected via coupling device 26, is oriented identically (e.g., "clocked" or "synced") with respect to first and second sides 30A and 30B, respectively. That is, the more heavily weighted sides (i.e., second sides 30B) of opposing rotors 24 are aligned and disposed directly across from each and about opposing sides of center point $C_P$. Together, the two sets of imbalanced rotors 24 act as two rotating imbalanced rotors centered at $C_P$ for generating a controllable rotating force vector at or about center point $C_P$, the magnitude and phase of which may be controlled by phasing the rotation of first and second sets of imbalanced rotors 24 with respect to each other.

Device housing 22 includes center point $C_P$, which may include a through hole or opening having an inner diameter D adapted for placement over a stationary or rotating structure, machine, vehicle, etc., or portions thereof. Housing 22 and/or center point $C_P$ may be stationary (i.e., non-spinning) or non-stationary (i.e., rotating or spinning). For example and as described in detail below, device 20 is configured for provision over and/or attachment to a stationary piece of equipment or machinery (FIG. 8), such as a material vibrator, conveyor, etc. In some embodiments, device 20 is configured for provision over and/or attachment to a rotating or spinning structure or vehicle, such as a spinning or rotating rotor head, hub, or shaft of a rotary wing aircraft (e.g., a helicopter main/tail or tandem rotor). When device 20 attaches to a rotating or spinning structure, housing 22 also spins about center point $C_P$. Thus, movement of rotors 24 via belts or coupler devices 26 cancels out centrifugal forces on the imbalanced rotors 24. Imbalanced rotors 24 rotate in synchronized movements about non-coaxial axes with respect to each other and center point $C_P$. The non-coaxial rotation generates a force at or about center point $C_P$.

FIG. 2C is a sectional view of device 20 along the lines 2C-2C indicated in FIG. 2B. As FIG. 2C illustrates, imbalanced rotors 24 may be disposed along different planes (e.g., a first plane $P_1$ and a second plane $P_2$) of and/or with respect to device housing 22. Pairs, sets, or groups of co-rotating imbalanced rotors 24 are mechanically coupled or linked along the different planes via coupling devices 26. The coupled imbalances rotors 24 co-rotate about non-coaxial shafts 32 including non-coaxial axes (i.e., $A_1$, $A_2$) for generating vibration cancelling forces. Two or more sets of imbalanced rotors 24 collectively generate a force having a force vector F at or about center point $C_P$ of device 20, where the force vector F rotates in-plane.

At least one imbalanced mass 24 per mechanically coupled set of rotors, and in some embodiments, only one imbalanced rotor 24 per mechanically coupled set of rotors, is directly driven via motor 28. Motor 28 may include a brushed or a brushless motor configured to directly rotate one imbalanced rotor 24 about a first axis $A_1$, and indirectly rotate additional imbalanced rotors 24 about at least one other axis (e.g., $A_2$), or multiple axes, by virtue of being coupled or linked with the directly driven rotor 24 which rotates about first axis $A_1$. Motors 28 may be disposed directly above one or more imbalanced rotors (e.g., per FIG. 1) or directly below imbalanced rotors 24 as illustrated in FIGS. 2A to 2C. Any configuration, position, and/or placement design of motors 28 and rotors 24 is contemplated, and may be provided.

Figure 3B:
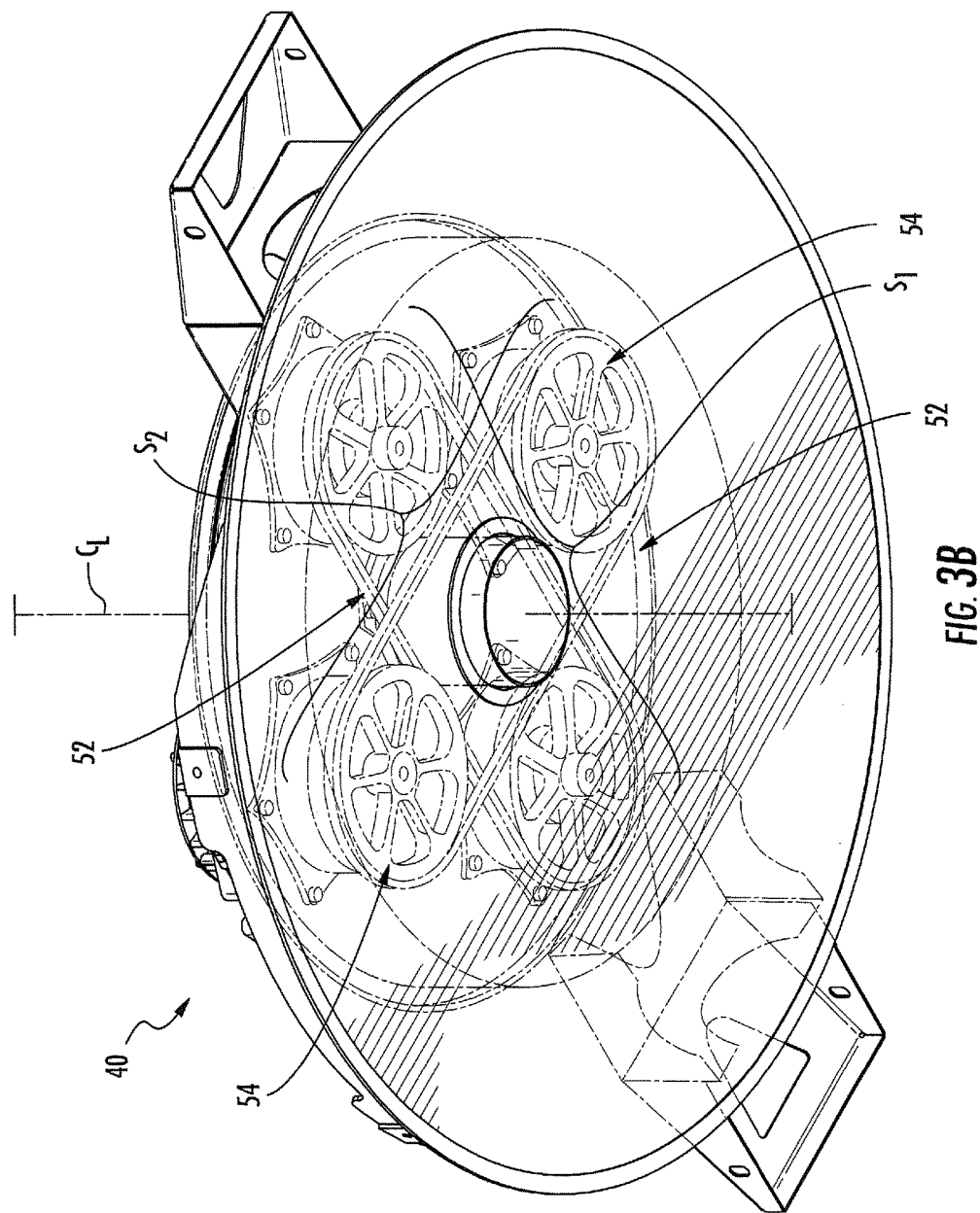

FIGS. 3A and 3B illustrate a further embodiment of a CFG device, generally designated 40 for vibrating a structure, such as industrial equipment. Device 40 includes a housing, generally designated 42 and one or more individual units, generally designated 44, disposed and/or bolted therein. Housing 42 may include a first portion 42A and a second portion 42B disposed inside the first portion 42A. First portion 42A may include an attachment portion adapted to mount or attach to a vibrating structure. Second portion 42B may include a force generating portion disposed above and/or below first portion 42A. In some embodiments, first portion 42A is held stationary over a vibrating structure, and second portion 42B rotates or spins relative to first portion. In other embodiments, first and second portions 42A and 42B both spin and/or rotate over or with a vibrating structure. In yet further embodiments, first and second portions 42A and 42B are both held stationary over a vibrating structure.

Units 44 may include both directly driven units 44A and indirectly driven (i.e. "follower") units 44B, which are described in detail below with regards to FIGS. 4A and 4B. Directly driven units 44A include a motor (58, FIG. 4A) for directly driving one or more imbalanced rotors disposed therein. Follower units 44B are devoid of a motor, but synchronously and simultaneously co-rotate with directly driven units by virtue of being mechanically coupled or linked thereto via a belt, chain, gear, sprocket, wheel, pulley, axle, or any other coupler, coupling member or device.

In some embodiments, housing 42 includes a centrally disposed aperture, through hole, or opening 46. Opening 46 allows housing 42 to be disposed over, straddle, and/or otherwise connect to a portion of a rotating structure, vehicle, equipment, etc. Opening 46 and housing 42 designs may be scaled up or down, thereby allowing device 40 to be connected to multiple different types of vibrating structures at a low cost. Sets of separate, co-rotating imbalanced rotors rotating about different axes (i.e., non-coaxial rotors) generates vibration forces and/or vibration cancelling forces about a central axis $C_L$ or center point $C_P$. The magnitude and phase of the resultant force is controllable via phasing the sets of imbalanced rotors differently. Opposing modules or units in each set (e.g., 44A and 44B in $S_1$) maintain a fixed phase relationship via the use of a timing belt, chain, sprocket, etc.

In some embodiments, housing 42, and/or portions thereof, is configured to spin or rotate with a vibrating structure, or a portion or component thereof. For example, housing 42 may attach to and rotate with a rotor head of a helicopter. In other embodiments, housing 42 is held stationary over a vibrating structure, or portion thereof. For example, housing 42 may be mounted over a stationary industrial machine or piece of equipment such as a vibratory conveyor or feeder. Any centrifugal torque acting on individual imbalanced rotors associated with a spinning housing 42 is cancelled out via mechanically linked imbalanced rotators connected via a timing belt.

In some embodiments, individual imbalanced rotor modules or units 44 are configured to bolt into and/or otherwise join or mate with housing 42. In some embodiments, units 44 are coupled to housing 42 via mechanical fasteners or fastening members M, such as bolts, screws, pins, clips, etc. In some embodiments, units 44 are welded or otherwise structurally/physically joined with housing 42.

Each pair of units 44 includes at least one imbalanced rotor (50, FIGS. 4A and 4B) forming, including, supporting, and/or otherwise providing an imbalanced mass or imbalanced mass concentration. Imbalanced rotors 50 (FIGS. 4A and 4B) are configured to co-rotate in groups or pairs for generating vibration cancelling forces. For example and referring to FIG. 3B, device 40 includes a first set $S_1$ of imbalanced rotors disposed in a set of units 44 mechanically coupled via a timing belt 52 and a second set $S_2$ of imbalanced rotors disposed in a set of units 44 mechanically coupled via a second, additional timing belt 52. At least two opposing imbalanced rotors housed and/or disposed in opposing units 44 are configured in a single set via belt 52, however, more than two imbalanced rotors may also be coupled via a belt, chain, axle, wheel, pulley, sprocket, gear, or any other suitable coupler.

In some embodiments, timing belt 52 mechanically connects to a support or support portion 54 of each module or unit 44. Support portion 54 may include a pulley, sprocket, chain, axle, wheel, or other structures about which belt 52 may be provided and moved (e.g., translated/rotated between opposing support portions 54) for indirectly driving at least one other imbalanced rotor disposed, for example, in one or more follower units 44B. In some embodiments, a set of directly driven units 44A and follower units 44B are disposed 180° from each other about center point $C_P$.

In applications for which the housing is rotating, device 40 is operable at imparting and/or cancelling vibration even during instances where imbalanced rotors within units 44 become decoupled or disengaged, for example, in the event belt 52 becomes broken or disengaged. For example, in one failure mode where masses or rotors (i.e., 50, FIGS. 4A/4B) become decoupled (e.g., via broken or defective timing belt 52), the imbalanced rotors (i.e., 50, FIGS. 4A/4B) become tuned pendulum absorbers to attenuate in-plane vibration at or near center point $C_P$. Thus, where rotors or masses within units 44 decouple, device 40 is configured to absorb vibration as opposed to generate vibration cancelling force. In-plane vibrations in rotating machinery or equipment may be suppressed via identically oriented decoupled imbalanced rotors within opposing units 44, as the rotors transition into absorbers, which remain tuned to the in-pane vibration of the vibrating equipment to which device 40 is attached.

Figure 4A:
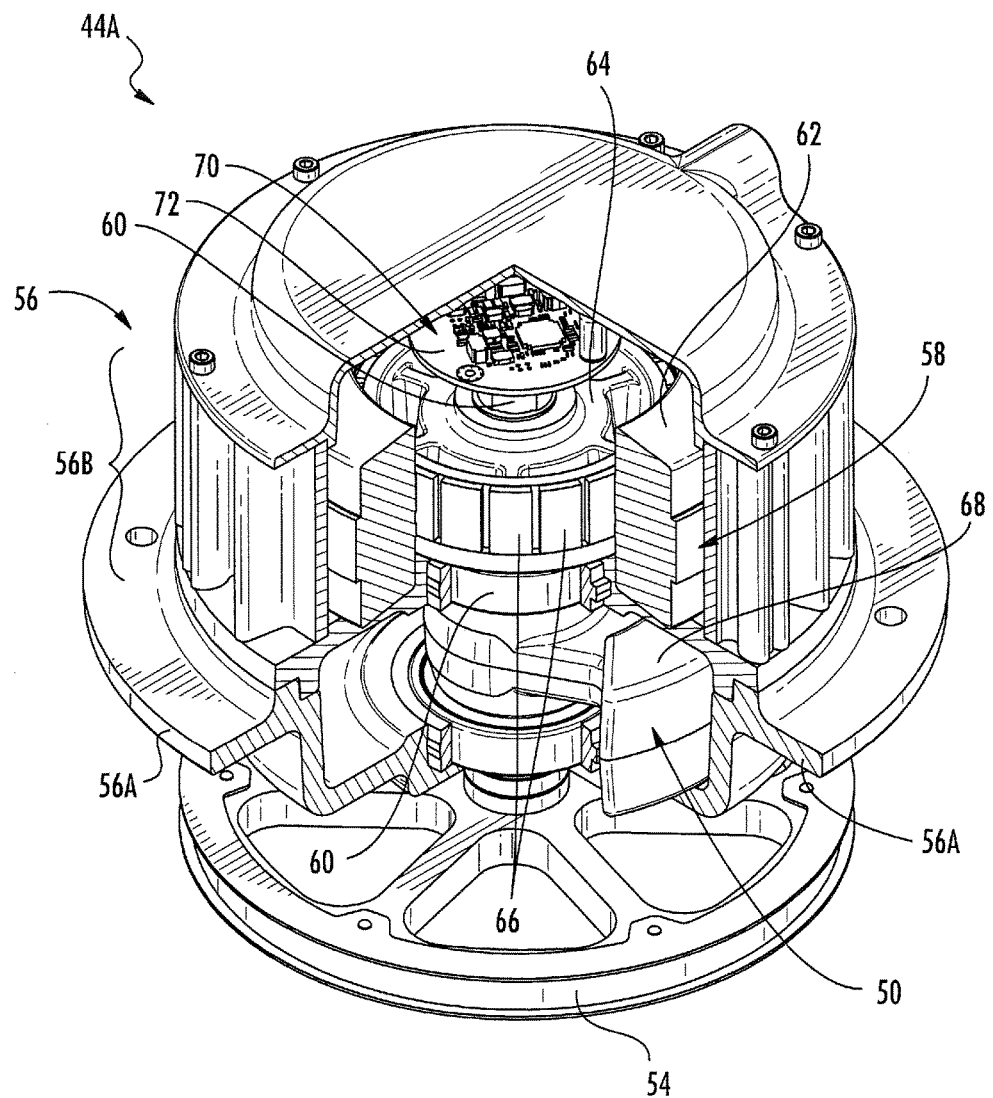
FIGS. 4A and 4B illustrate perspective and sectional views of directly and indirectly driven units of the CFG device illustrated in FIGS. 3A and 3B, according to aspects of the disclosure herein.
Figure 4B:
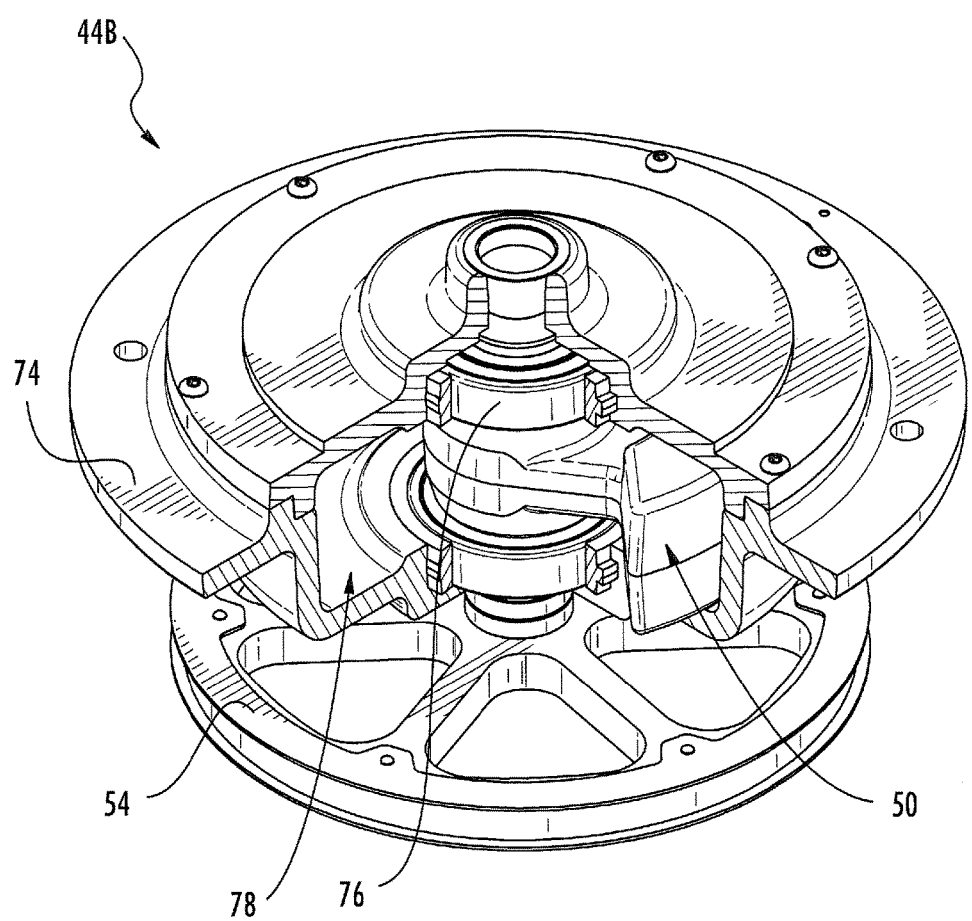

FIGS. 4A and 4B are cut-away perspective views of individual units 44, namely of a directly driven unit 44A (FIG. 4A) and an indirectly driven follower unit 44B (FIG. 4B). Referring to FIG. 4A, directly driven unit 44A includes an outermost housing, generally designated 56, which may include one or more housing portions 56A and 56B. Housing portions 56A and 56B may be disposed about at least one imbalanced rotor, generally designated 50, and a motor, generally designated 58, for directly driving or rotating imbalanced rotor 50. Imbalanced rotor 50 is configured to rotate about and/or by a rotation shaft 60. Shaft 60 may physically and/or mechanically connect, link, join, and/or extend through portions of imbalanced rotor 50 and support portion 54, such that support portion 54 rotates in sync with imbalanced rotor 50. As imbalanced rotor 50 rotates, a belt (52, FIG. 3B) disposed in or about support portion 54 induces movement of a non-coaxial imbalanced rotor 50 disposed within an indirectly driven, follower unit 44B (FIG. 4B). That is, a belt (i.e., 52, FIG. 3B) connects support portions 54 of a respective directly driven unit 44A and a follower unit 44B (see FIG. 3B) disposed in a physically joined (i.e., coupled or linked) set, such that follower unit 44B co-rotates in sync with directly driven unit 44A.

In some embodiments, motor 58 includes a brushless motor. Motor 58 includes a motor winding assembly 62. Motor winding assembly 62 is disposed about a centrally disposed motor rotor 64. Device 40 includes at least one annular shaped motor assembly 62 for rotating and directly driving imbalanced rotor 50 about shaft 60. A plurality of permanent magnets 66 is disposed about motor rotor 64. Permanent magnets 66 may interface with electromagnets provided on the motor winding assembly 62 causing rotation of imbalanced rotor 50 extending therefrom. Imbalanced rotor 50 includes an integrally formed imbalanced mass 68 or a separately formed imbalanced mass. Imbalances rotors 50 of units 44A and 44B include or support imbalanced masses 68 for synchronized rotation about non-coaxial axes to provide a rotting force proximate center point $C_P$ (FIG. 3A) of device 40. Permanent magnets 66 interface with electromagnets for controlling a direction, a rotational speed, a rotational position, and/or a rotational phase of the imbalanced rotor 50 and respective masses 68, according to commands received within a circuitry component or electrical unit, generally designated 70.

Electrical unit 70 may include a plurality of hardware electrical and circuitry components disposed over a circuit carrying substrate 72, such as a circuit board. Electrical unit 70 may include sensors (e.g., a rotary encoder, accelerometer(s), and/or temperature sensor(s)), one or more processors (e.g., a power chip or other hardware processing component) and a memory (e.g., a memory chip or other hardware memory component). A processor disposed on and/or in electrical communication with in electrical unit 70 is configured to control electric signals received at motor 58 thereby controlling a rotation speed and/or a rotation frequency of the plurality of linked imbalanced rotors 50 for generating and imparting vibrating forces and/or vibration cancelling forces to the structure, machinery, equipment, vehicle, etc., to which device 40 is attached.

FIG. 4B illustrates follower unit 44B. Follower unit 44B is devoid of a motor or direct driving component. Follower unit 44B includes an outermost housing 74 adapted to bolt or otherwise attaching to housing 42 of device 40 (FIG. 3A). Housing 74 is held stationary within housing 42 of device (FIG. 3A) and housing 42 of device may be held stationary or spin, depending upon the type of machine to which it is attached.

Follower unit 44B includes an imbalanced rotor 50 configured to rotate about a shaft 76 via rotation of a timing belt (e.g., 52, FIG. 3B) and support portion 54. Imbalanced mass 50 rotates about shaft 76 within an enclosure or spacing, generally designated 78, disposed within and/or between portions of housing 72. The speed, rotation, and position of imbalanced rotor 50 of follower unit 44B is synchronized in regards to the speed, rotation, and position of imbalanced rotor 50 of directly driven unit 44A FIG. 4A). Co-rotation of imbalanced rotors 50 within directly driven and follower units 44A and 44B, respectively, generates a rotating force proximate center point $C_P$ of device 40 (see FIG. 3A) for imparting forces to vibrate or control vibration of the structure to which it is attached.

Figure 5:
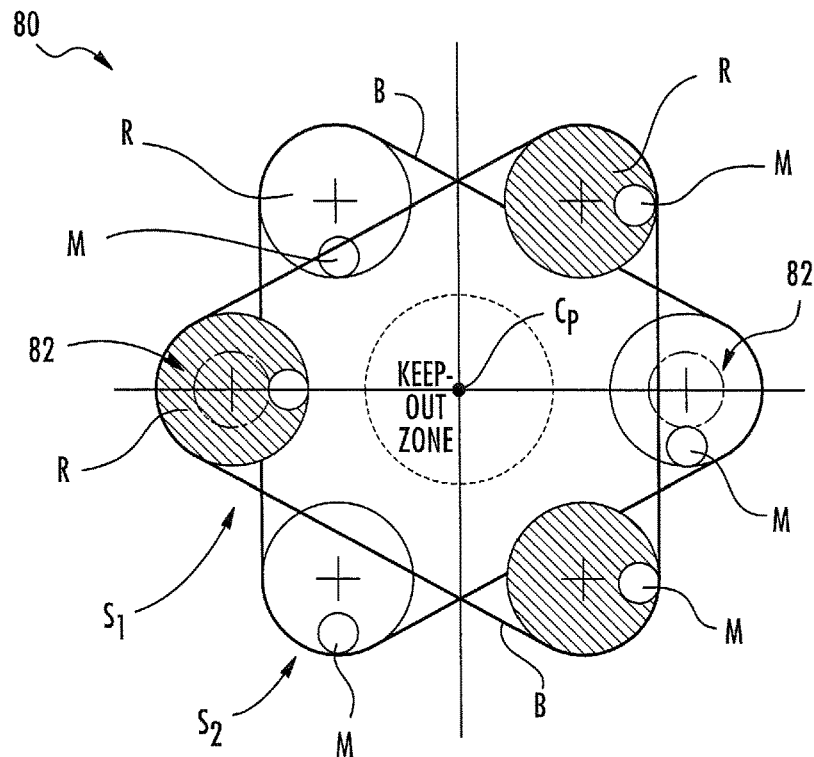
FIGS. 5 through 7 schematically illustrate further embodiments of CFG devices according to aspects of the disclosure herein.
Figure 6:
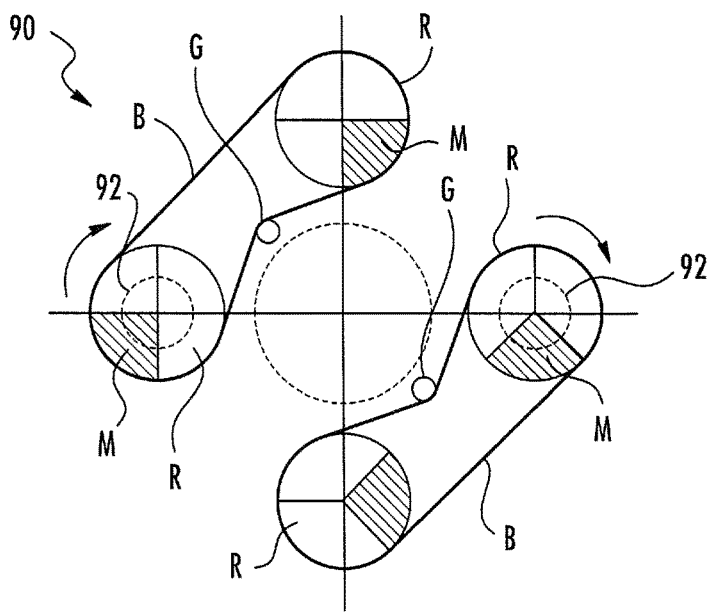
Figure 7:
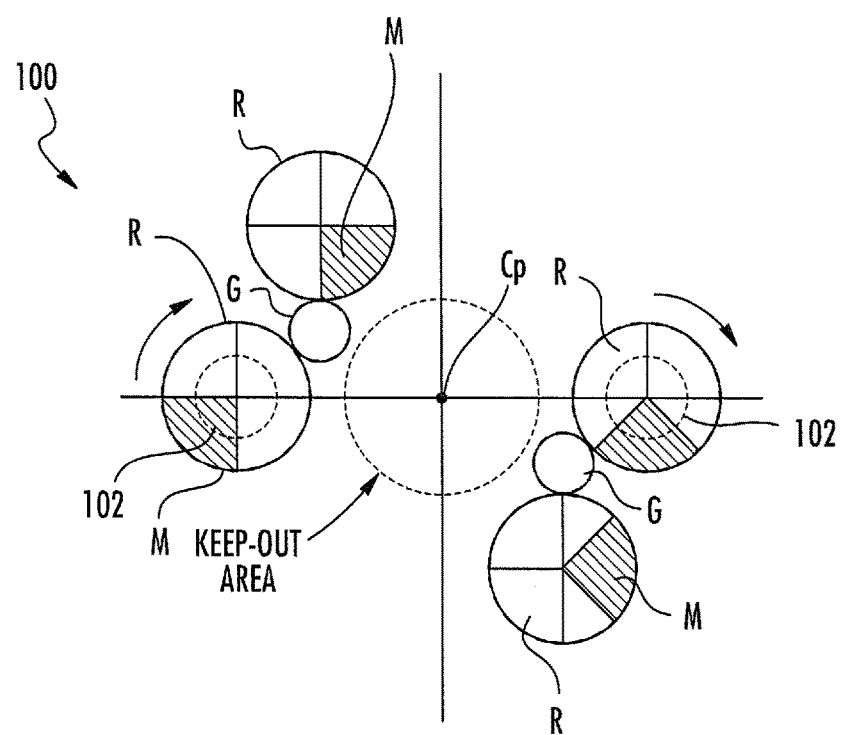

FIGS. 5 to 7 schematically illustrate various exemplary imbalanced mass groupings, placement, positioning, and/or rotation scenarios associated with CFG devices, systems, and methods described herein. FIGS. 5 to 7 schematically illustrate exemplary CFG devices including a plurality of imbalanced rotors R and mass concentrations M that are non-coaxially disposed for rotating about non-coaxial axes with respect to a center point $C_P$ of each device. Referring to FIG. 5, in some embodiments a CFG device, generally designated 80, includes multiple sets or groups of imbalanced rotors R and respective imbalanced masses M. In some embodiments, a set or group of imbalanced rotors R may include three imbalanced sprockets interconnected by a timing belt B. For example, FIG. 5 includes provision of a first set, generally designated $S_1$, of imbalanced rotors R (also designated in hatched lines) and a second set, generally designated $S_2$, of imbalanced rotors R or sprockets (designated in white). Each set of rotors R includes one motor 82 for driving at least three imbalanced sprockets or rotors R about individual non-coaxial axes as belts B move about center point $C_P$. Masses M may be symmetrically disposed and/or symmetrically oriented about center point $C_P$.

Each motor 82 directly drives or rotates a single imbalanced sprocket of each group, and indirectly drives at least two other imbalanced sprockets of the respective group. Motors 82 of opposing groups or sets may be oriented 180 degrees (°) apart providing a static mass balance. Opposing rotors R, which are oriented 180° apart, are configured to rotate in a same direction, which allows the overall CFG authority to be distributed amongst more than two imbalanced rotors R and consequently bearing stresses are better distributed over more bearings. This enables the use of smaller, less expensive, and lower weight bearings. The "keep out zone" illustrated in FIG. 5 refers to an area of the device that should remain devoid of couplers, such as belts B, so as not to negatively interfere with an underlying vibrating structure or machine. Sets of rotors R may be coupled via gears, belts, chains, pulleys, axles, or any other suitable coupling device.

FIG. 6 illustrates a CFG device, generally designated 90, which also includes multiple sets of imbalanced rotors R having imbalanced mass concentrations M configured to co-rotate about non-coaxial axes. Sets of rotors R are mechanically coupled via couplers, such as belts B. One or more idler gears G or sprockets prevent belts B from overlapping portions of the keep out zone. Motors 92 rotate one rotor R directly, and at least one other rotor R indirectly. Rotors R in each set co-rotate in a same direction (e.g., either counter clockwise or clockwise) as indicated by the arrows. The masses M within a given set are, again, clocked or co-oriented in such a way as to prevent torsional moments about center point $C_P$.

FIG. 7 illustrates a CFG device, generally designated 100, which also includes multiple sets of imbalanced rotors R having imbalanced mass concentrations M configured to co-rotate about non-coaxial axes. Sets of rotors R are mechanically coupled via couplers, such as gears G. That is, in some embodiments, rotors R are mechanically coupled or linked via couplers other than belts, and may be devoid of belts altogether. Motors 102 rotate one rotor R directly, and at least one other rotor R indirectly. Rotors R in each set co-rotate in a same direction (e.g., either counter clockwise or clockwise) as indicated by the arrows. The masses M within a given set are, again, clocked or co-oriented in such a way as to prevent torsional moments about a center point.

FIGS. 6 and 7 are adapted for provision about or around a rotating shaft or machinery component without requirement machinery disassembly. This prevents creating a moment about the center line of the keep-out area due to mass orientation, as shown. The motors 92, 102 may be oriented approximately 180° apart to provide static mass balance. If the entire assembly is rotating (e.g., as on a rotor hub), the centrifugal force loading on the masses will balance through belt loading so that there is no direct centrifugal force impact on motor torque. If the entire assembly is rotating and a belt breaks, then the centrifugal force will send all masses to an outer diameter, which will produce zero net force on the rotating shaft. The broken belt scenario can thus reproduce the passive vibration absorber effect of a pendulum absorber.

Figure 8:
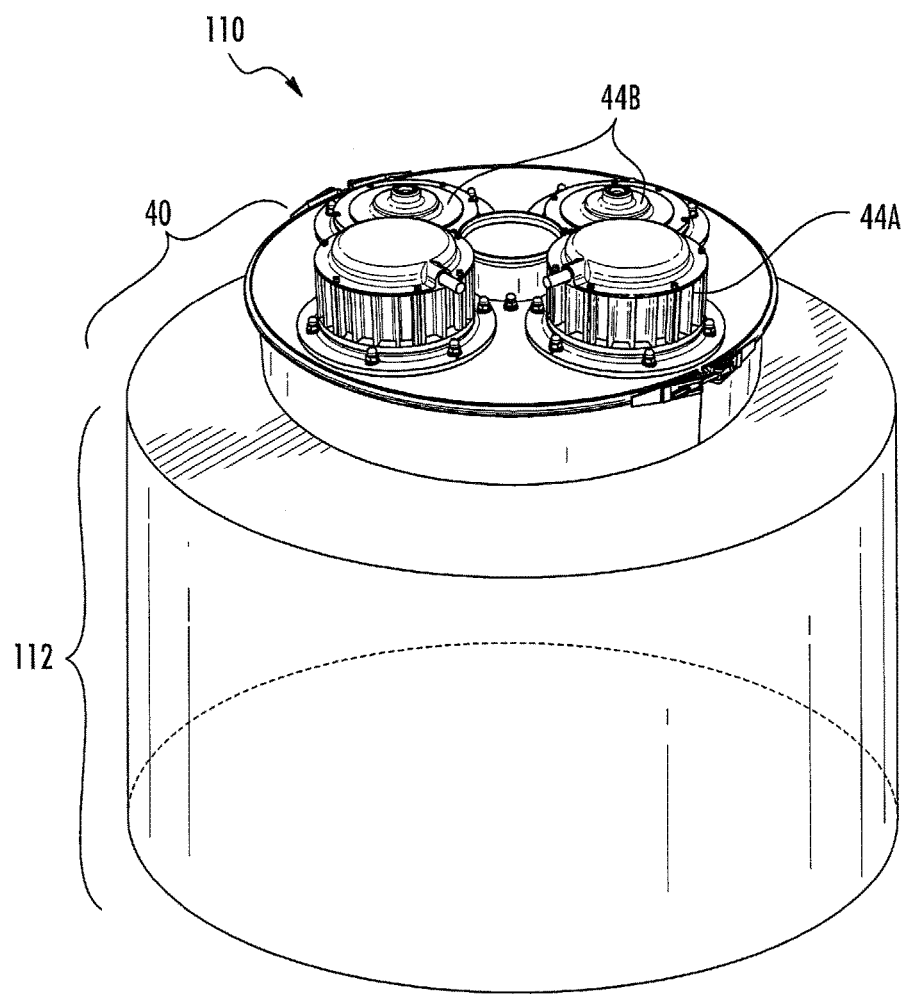
FIG. 8 illustrates a CFG system according to aspects of the disclosure herein.

FIG. 8 illustrates a CFG system incorporating at least one CFG device, generally designated 110. System 110 includes a CFG device 40 (i.e., previously described in FIGS. 3A to 4B) and a vibrating structure 112. Structure 112 may include industrial equipment or a vibrating machine adapted to convey material by imparting vibration thereto. For illustration purposes, structure 112 is generically and schematically depicted as a cylinder, but can take on any size, shape, form and/or include any type of machine or industrial equipment. In some embodiments, CFG device 40 is disposed directly over, on, and/or above vibrating structure 112. CFG device 40 is configured to generate vibrations allowing structure 112 to function, or vibration cancelling forces for reducing or mitigating vibrations before such impart damage and/or fatigue stresses to the structure 112 and/or components thereof.

Vibrating structures 112 are not limited to industrial equipment, but may include any machine, platform, vehicle, aircraft, and/or any other structure in need of a vibrating force and/or a vibration cancelling force.

Figure 9B:
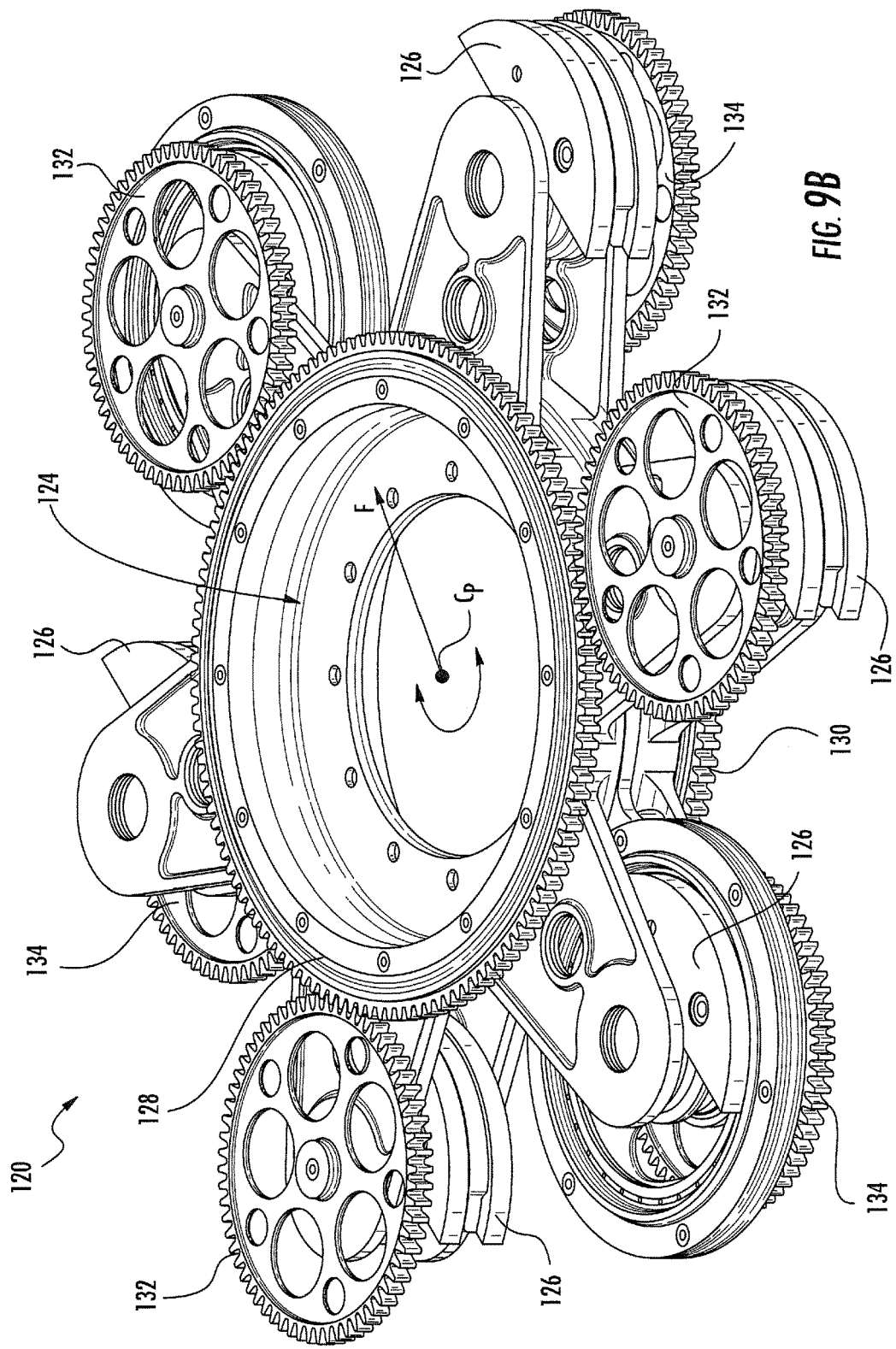

FIGS. 9A and 9B are embodiments of an additional CFG device, generally designated 120. Device 120 includes a housing 122 for housing rotating components, and a central opening, generally designated 124. FIG. 9B illustrates the inner portions of device 120, which are disposed within housing 122.

Device 120 includes a plurality of imbalanced masses 126 supported by a plurality of rotors. Rotors and respective masses 126 may be grouped into one or more co-rotating sets which rotate in a same direction and have a synchronized orientation about different (i.e., non-coaxial) axes. Rotational movement of imbalances masses 126 is induced via rotation of one or more centralized gears.

In some embodiments, a first centrally disposed gear 128 rotates a first set of rotors 132 supporting respective imbalanced masses 126. A second centrally disposed gear 130 rotates a second set of rotors 134 supporting respective imbalanced masses 126. In some embodiments, first and second centralized gears 128 and 130, respectively, are vertically disposed with respect to each other. First and second sets of rotors 132 and 134, respectively, are also vertically disposed within device 120.

In some embodiments, first and second sets of rotors 132 and 134, respectively, rotate masses thereby generating a rotating centralized force having a force vector F rotating about a center point $C_P$ of device 120. In some embodiments, opening 124 is disposed about a rotating shaft (not shown), such as a component of a rotor head or main rotor hub of a helicopter. At least two of the rotors 132 and 132 are disposed 180° apart and have motors therein. The motors rotate (e.g., directly or indirectly) rotors in each of the sets. This is similar to the embodiment illustrated schematically in FIG. 5, however, here spur gears are used in the place of a timing belt.

Figure 10:
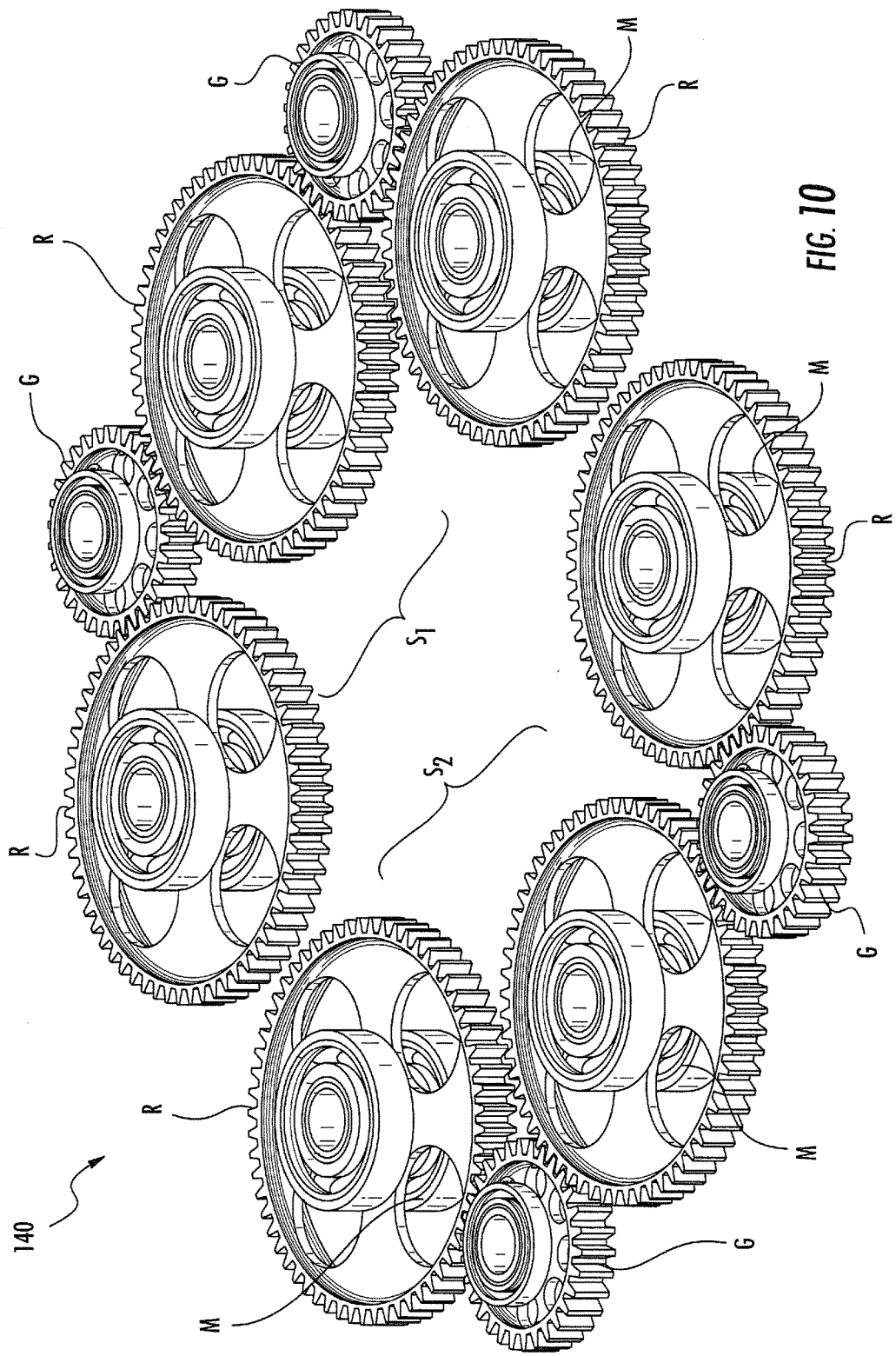
FIG. 10 illustrates a further embodiment of a CFG device according to aspects of the disclosure herein.

FIG. 10 is a further embodiment of a CFG device, generally designated 140. Device 140 includes two side-by-side (i.e., adjacent) sets of imbalanced rotors and respective imbalanced masses M. Rotors and masses R and M, respectively, co-rotate at a same time, speed, and in sync via gears G. This is similar to the embodiment illustrated schematically in FIG. 6, however, here spur gears are used in the place of a timing belt.

Figure 11:
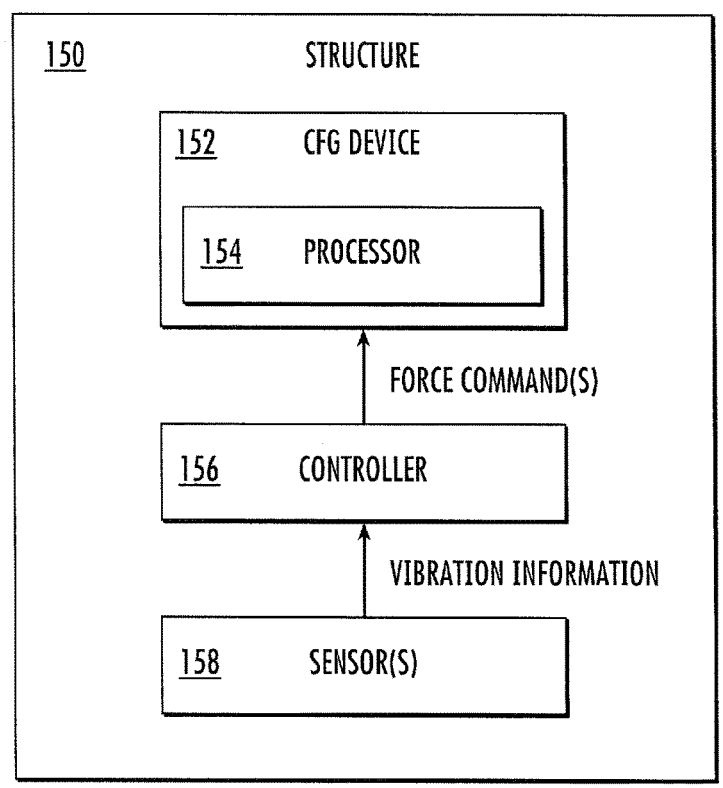
FIG. 11 schematically illustrates a CFG system according to aspects of the disclosure herein.

FIG. 11 is a schematic block diagram illustrating an exemplary CFG system, generally designated 145. CFG system 145 includes a structure 150. Structure 150 includes any suitable structure, machine, platform, equipment, vehicle (including fixed and rotary winged aircraft), or components thereof, either in need of vibrating forces imparted thereto and/or generation of vibration cancelling forces. Structure 150 may include a building, a bridge, industrial equipment, vehicular components such as a rotor hub of a helicopter, a tail rotor, an engine structure, or any other suitable structure either in need of vibratory forces imparted thereto (e.g., a structure 112, FIG. 8) or a structure in need of vibration control (e.g., a rotor hub). System 145 enables a low cost CFG on such machinery or equipment, and is useful in applications where a CFG needs to straddle a support structure or a material inlet or outlet port. In these applications, CFG system 145 creates prescribed vibration profiles for industrial equipment.

Structure 150 includes a CFG device 152 disposed thereon, mounted thereto, or otherwise physically connected to one or more portions of structure 150 for imparting vibration control or for imparting vibration thereto. CFG device 152 includes structural features of any of the previously described devices previously (e.g., devices 10, 20, 40, 80, 90, 100, 120, 140).

CFG device 152 may include at least one or more hardware processors 154. Processor 154 is adapted to control an amount of electrical current, power, or electrical signal transmitted to drive motors or other driving components of CFG device 154. In some embodiments, processor is configured to receive and execute (i.e., process) software stored in a memory thereof for executing force commands communicated from a controller 156. In some embodiments, software may be implemented via a non-transitory computer readable medium having stored thereon computer executable instructions that when executed by processor 154 allow device 152 to generate a force as communicated via a force command or commands from controller 156. The force or forces generated by one or more devices 152 may apply vibration to a machine or equipment alone and/or for actively controlling complex vibration occurring within a structure or vehicle (e.g., an aircraft) due to rotating components thereof. Controller 156 may be configured to generate and send force commands to one or more CFG devices 152. Any number of CFG devices may be provided in system 145.

Controller 156 is illustrated as being disposed in and/or co-located with structure 150, however, controller may be disposed external from and/or located away from structure 150, as the vibrations can be controlled remotely. Controller 156 can be disposed at any given location on or away from structure 150.

In some embodiments, system 145 is configured to monitor vibrations within structure 150 via a plurality of sensors 158 for generating forces to actively control vibration. In some embodiments, sensor 158 may actively test for structural responses to vibration control implemented via CFG device 152 over time. Sensors 158 may be active in that as device 152 creates active forces for cancelling vibrations, changes may be detected via sensors 158 and actively responded to via generation of force commands at controller 156, and implementation of force commands at device 152. That is, in some embodiments, controller 156 may monitor vibrations via sensors 158 and send force commands to CFG device 152 for generating vibration forces or vibration cancelling forces. In some embodiments, sensors 158 are also included and/or disposed within CFG device 152.

Figure 12:
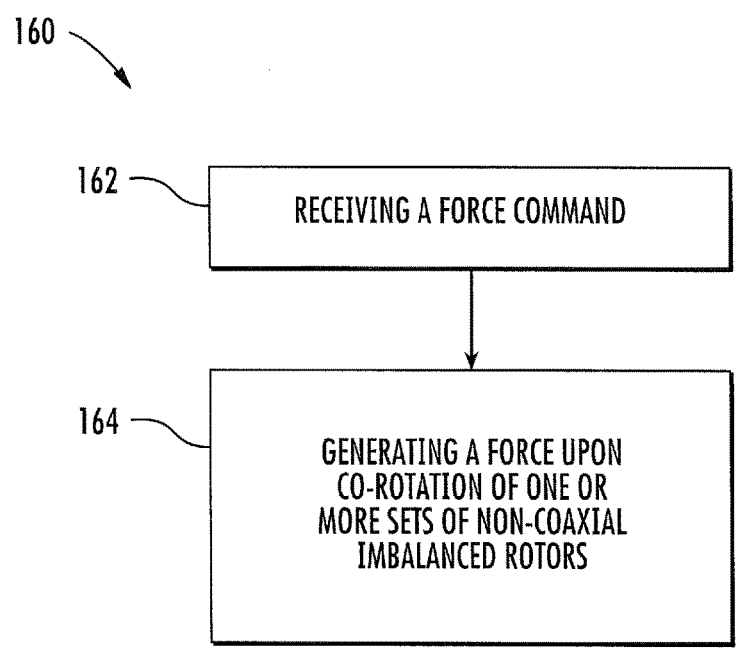
FIG. 12 illustrates generating a force via a CFG device or system according to aspects of the disclosure herein.

FIG. 12 is an exemplary block diagram of a method, generally designated 160, for operating and/or generating a force via CFG devices and/or systems described herein. The generated force can either impart operability to a structure, equipment, or device or impart vibration control to a vibrating structure. In block 162, a force command is received. The force command may be received at a CFG device of a CFG system. A controller may generate and send the force command to CFG device according to information received at one or more sensors.

In block 164, a force is generated via co-rotation of one or more sets of non-coaxial imbalanced rotors either including imbalanced masses or supporting imbalanced mass concentrations. In some embodiments, a plurality of sets of imbalanced rotors are provided, there each set includes two, three, or more than three imbalanced rotors. In some embodiments, imbalanced rotors co-rotate about different (i.e., non-coaxial) axes.

Exemplary application to which CFG devices and/or systems may be useful include using two CFGs about a vertical centerline of the equipment around both an input port and an output port for providing four degrees of freedom of vibratory control (two lateral, two rocking) to enable a controllable orbital motion. CFG devices and system are also applicable to vibratory conveyors and other industrial vibratory machines.

CFG devices and/or systems may also be used on main/tail/tandem rotor hubs such as helicopter rotor heads. In particular, CFG devices and/or systems herein create in-plane vibration cancelling forces. Such forces are sometimes created by pendulum absorbers, and more recently by a hub mounted vibration control system (HMVS) including CFG devices. CFG devices and systems herein may be attached to two different rotor heads. A slip ring and device system often reside at the center line of the hub. Thus, annular ring or donut shaped CFG devices/systems are useful in accommodating such equipment. CFG device and systems described herein are devoid of expensive thin, ring shaped motors and bearings.

Embodiments as described herein may provide one or more of the following beneficial technical effects: reduced production cost; improved ease of installation; scalability for use a wide variety of applications requiring vibration control; reduced weight; and/or improved vibration control. Other embodiments of the instant subject matter will be apparent to those skilled in the art from a consideration of this specification or practice of the invention disclosed herein. Thus, the foregoing specification is considered merely exemplary of the current invention with the true scope thereof being defined by the following claims.

What is claimed is:

1. A force generating device comprising:
   an opening or keep-out zone positioned about a center point;
   a first set of imbalanced rotors disposed about the center point and positioned outside of the opening or keep-out zone; and
   a second set of imbalanced rotors disposed about the center point and positioned outside of the opening or keep-out zone, wherein:
      the first set of imbalanced rotors is configured to co-rotate synchronously about the center point;
      the second set of imbalanced rotors is configured to co-rotate synchronously about the center point; and
      the first and second sets of imbalanced rotors are configured to create a controllable rotating force vector having a controllable magnitude and phase about the center point; and
   wherein the first and second set of imbalanced rotors are configured to create a zero net moment.

2. The force generating device of claim 1, wherein the first set of imbalanced rotors is configured to create a first rotating force vector having a fixed magnitude about the center point.

3. The force generating device of claim 2, wherein the second set of imbalanced rotors is configured to create a second rotating force vector having a fixed magnitude about the center point.

4. The force generating device of claim 1, wherein each of the first and second sets of imbalanced rotors includes two or more imbalanced rotors.

5. The force generating device of claim 1, wherein each of the first and second sets of imbalanced rotors includes three or more imbalanced rotors.

6. The force generating device of claim 1, wherein the first set of imbalanced rotors includes a first plurality of imbalanced rotors that are coupled together via a first mechanical coupling device.

7. The force generating device of claim 6, wherein the second set of imbalanced rotors comprises a second plurality of imbalanced rotors that are coupled together via a second mechanical coupling device.

8. The force generating device of claim 7, wherein the first mechanical coupling device or the second mechanical coupling device comprises a belt.

9. The force generating device of claim 7, wherein the first mechanical coupling device or the second mechanical coupling device comprises a gear.

10. The force generating device of claim 7, wherein the first mechanical coupling device or the second mechanical coupling device comprises a sprocket.

11. The force generating device of claim 7, wherein a circular force generator (CFG) housing spins or rotates about a rotating center point.

12. The force generating device of claim 7, wherein a circular force generator (CFG) housing is stationary or non-rotating about a stationary center point.

13. The force generating device of claim 1, wherein the first and second sets of imbalanced rotors are co-planar.

14. A force generating system comprising:
    a controller; and
    a circular force generator (CFG) device configured to receive control commands from the controller, wherein the CFG device includes at least a first set of imbalanced rotors configured to co-rotate synchronously about different, non-coaxial axes;
    an opening or keep-out zone positioned about a center point;
    wherein the at least the first set of imbalanced rotors is configured to create a rotating force vector at or about the center point of the CFG device, the at least the first set of imbalanced rotors positioned outside of the opening or keep-out zone and the at least the first set of imbalanced rotors are configured to create a zero net moment.

15. The force generating system of claim 14, wherein the first set of imbalanced rotors are disposed 180° apart about the center point of the CFG device.

16. The force generating system of claim 14, further comprising a second set of imbalanced rotors configured to co-rotate synchronously about different, non-coaxial axes.

17. The force generating system of claim 16, wherein the imbalanced rotors in the first and second sets of imbalanced rotors are disposed in an annular ring about the center point.

18. The force generating system of claim 16, wherein each of the first and second sets of imbalanced rotors includes two or more imbalanced rotors.

19. The force generating system of claim 16, wherein each of the first or second sets of imbalanced rotors is mechanically coupled via at least one belt, gear, chain, or sprocket.

20. The force generating system of claim 14, wherein the center point is spinning or stationary.

21. The force generating device of claim 14, wherein the step of generating the force in response to receiving the force command further comprises co-rotating the at least first set of imbalanced rotors within a same plane.

22. A method of generating a force via a circular force generator (CFG) device, the method comprising:
   receiving a force command; and
   generating the force in response to receiving the force command, wherein generating the force includes co-rotating one or more sets of imbalanced rotors about different, non-coaxial axes disposed about a center point of the CFG device and positioned outside of an opening or keep-out zone, the one or more sets of imbalanced rotors are configured to create a zero net moment.

23. The method of claim 22, wherein the step of co-rotating the one or more sets of imbalanced rotors includes directly rotating a first imbalanced rotor and indirectly rotating one or more additional imbalanced rotors.

24. The method of claim 23, wherein directly rotating the first imbalanced rotor includes rotating the first imbalanced rotor via a motor.

25. The method of claim 22, wherein the step of co-rotating the one or more sets of imbalanced rotors further comprises co-rotating at least two sets of imbalanced rotors about the non-coaxial axes.

26. The method of claim 25, wherein each set of imbalanced rotors includes two imbalanced rotors.

27. The method of claim 25, wherein each set of imbalanced rotors includes three imbalanced rotors.

28. The force generating device of claim 22, wherein co-rotating the one or more sets of imbalanced rotors further comprises rotating the one or more sets of imbalanced rotors within a same plane.

29. A force generating device comprising:
   a first set of imbalanced rotors disposed about a center point;
   a second set of imbalanced rotors disposed about the center point, wherein:
      the first set of imbalanced rotors is configured to co-rotate synchronously about the center point;
      the second set of imbalanced rotors is configured to co-rotate synchronously about the center point;
      the first and second sets of imbalanced rotors are configured to create a controllable rotating force vector having a controllable magnitude and phase about the center point; and
   wherein the imbalanced rotors in the first and second sets of imbalanced rotors are disposed in an annular ring about the center point.

30. A force generating system comprising:
   a controller;
   a circular force generating (CFG) device configured to receive control commands from the controller, wherein the CFG device includes at least a first set of imbalanced rotors configured to co-rotate synchronously about different, non-coaxial axes;
   a second set of imbalanced rotors configured to co-rotate synchronously about different, non-coaxial axes;
   wherein the first set of imbalanced rotors is configured to create a rotating force vector at or about a center point of the CFG device; and
   wherein the imbalanced rotors in the first and second sets of imbalanced rotors are disposed in an annular ring about the center point.

31. A method of generating a force via a circular force generator (CFG) device, the method comprising:
   receiving a force command; and
   generating a force in response to receiving the force command, wherein generating the force includes co-rotating at least a first and second set of imbalanced rotors about different, non-coaxial axes disposed about a center point of the CFG device;
   wherein the imbalanced rotors in the first and second sets of imbalanced rotors are disposed in an annular ring about the center point.

* * * * *